(12) United States Patent
Colacecchi et al.

(10) Patent No.: US 11,364,608 B2
(45) Date of Patent: Jun. 21, 2022

(54) QUICK RELEASE FASTENER ENGAGEMENT TOOL

(71) Applicant: The Boeing Company, Chicago, IL (US)

(72) Inventors: Jay Wallace Colacecchi, Lake Stevens, WA (US); Gerritt W. Kroeze, Arlington, WA (US); Mark James Wilson, Mount Vernon, WA (US)

(73) Assignee: The Boeing Company, Chicago, IL (US)

( * ) Notice: Subject to any disclaimer, the term of this patent is extended or adjusted under 35 U.S.C. 154(b) by 830 days.

(21) Appl. No.: 16/246,817

(22) Filed: Jan. 14, 2019

(65) Prior Publication Data

US 2020/0223040 A1 Jul. 16, 2020

(51) Int. Cl.
  *B25B 31/00* (2006.01)
  *B25B 27/14* (2006.01)
  *B25J 1/04* (2006.01)

(52) U.S. Cl.
  CPC .............. *B25B 27/14* (2013.01); *B25B 31/00* (2013.01); *B25J 1/04* (2013.01)

(58) Field of Classification Search
  CPC ..... B25B 27/14; B25B 31/00; B25B 13/5091; B25J 1/04
  See application file for complete search history.

(56) References Cited

U.S. PATENT DOCUMENTS

| | | | |
|---|---|---|---|
| 5,967,575 A * | 10/1999 | Blake | B63B 21/54 294/19.1 |
| 2008/0163725 A1 | 7/2008 | Hsieh | |
| 2008/0216612 A1 | 9/2008 | Hsieh | |
| 2010/0050819 A1 | 3/2010 | Nam | |
| 2014/0137708 A1 | 5/2014 | York et al. | |

\* cited by examiner

*Primary Examiner* — Rick K Chang
(74) *Attorney, Agent, or Firm* — Coats & Bennett, PLLC

(57) ABSTRACT

A tool for use with Quick Release (QR) fasteners, and related methods and kits. The tool generally includes an elongate main body with a fastener-receiving area. The fastener-receiving area is configured to simultaneously support the head of the QR fastener and depress the button of the QR fastener. The fastener-receiving area includes a slot that is distally and downwardly open, two shoulders that bound the slot, and a ventral surface. The QR fastener is inserted into the slot so that the head of the QR fastener rests on the first and second shoulders, the collar portion of the QR fastener extends through the slot, and the ventral surface depresses the button of the QR fastener. With the button depressed in this fashion, the retention feature of the QR fastener is released, which allows the worker to manipulate the QR fastener by moving the tool.

20 Claims, 8 Drawing Sheets

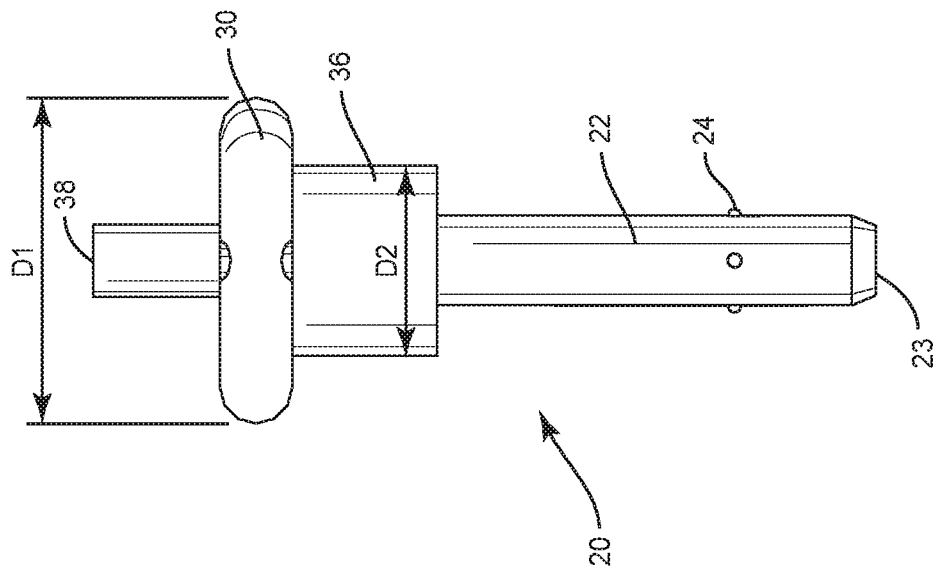
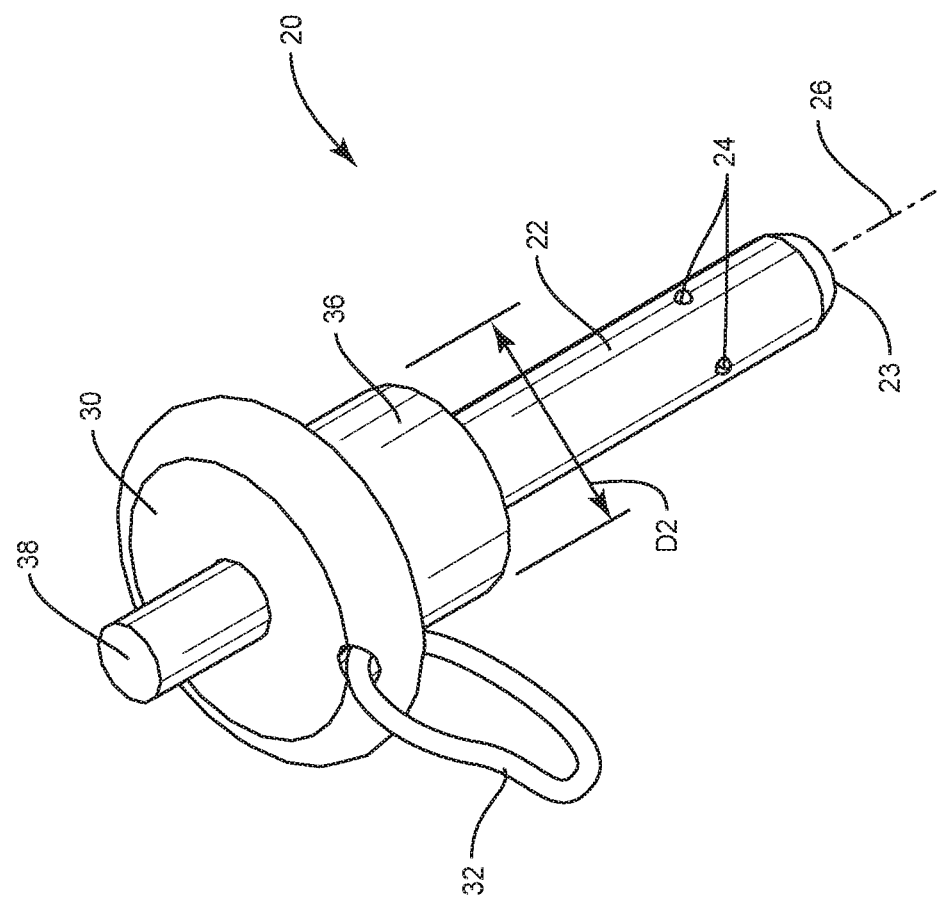

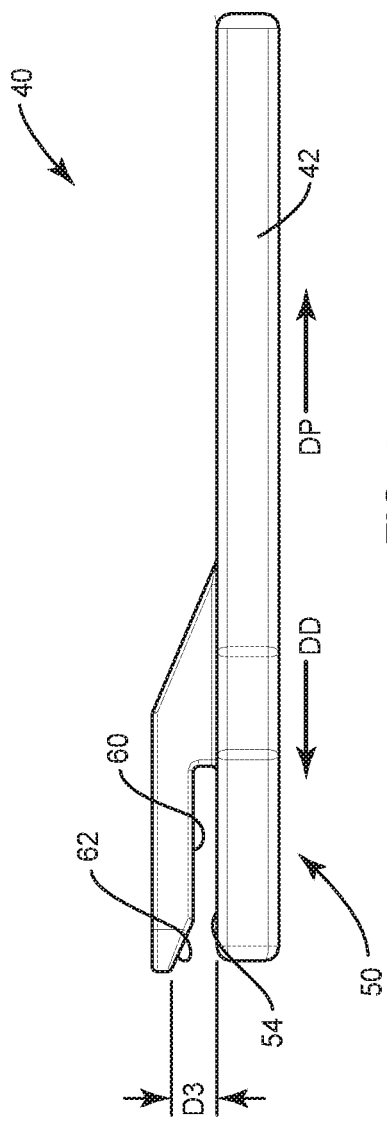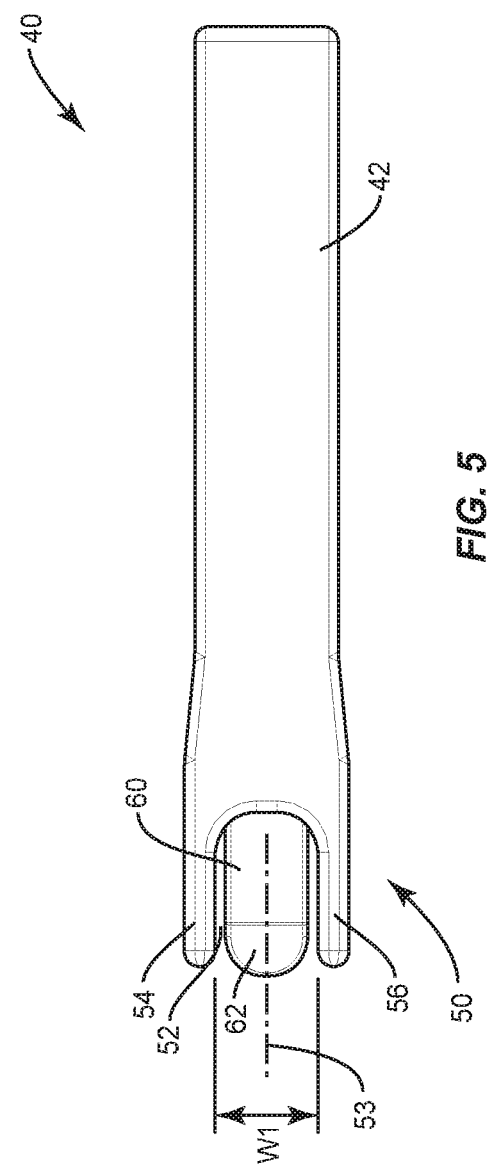

QUICK RELEASE FASTENER ENGAGEMENT TOOL

TECHNOLOGICAL FIELD

The present disclosure relates generally to tools for use with non-threaded fasteners, such as may be used for securing or aligning parts, like parts of an aircraft, and to related methods of manufacturing and/or servicing.

BACKGROUND

During assembly and/or rework, it is common that various components need to be secured together by fasteners. For example, components of an aircraft, such as internal fixtures, frequently need to be assembled together using non-threaded fasteners. One type of fastener is known as a Quick Release (QR) fastener, an example of which shown in FIGS. 1-2. As used herein, the term Quick Release fastener (or "QR fastener") means a fastener that includes an unthreaded shank, an enlarged head, a collar portion disposed longitudinally between the shank and the head, a depressible button, and at least one moveable retention feature (e.g., movable balls), wherein the QR fastener is configured such that depressing the button releases the retention feature.

Use of QR fasteners are desirable in many situations, but QR fasteners also pose some difficulties. One difficulty is that properly inserting or removing the QR fastener from the corresponding hole(s) in the components requires that the button be depressed. Typically, a worker's hands are used to simultaneously both depress the button and manipulate the QR fastener. However, providing sufficient clearance for the worker's hands may be problematic in areas with limited accessibility, and/or may not be ergonomically desirable for a variety of reasons.

Accordingly, there is a need for alternative approaches to manipulating QR fasteners. Such approaches should advantageously allow a worker to more easily manipulate a QR fastener, for insertion/removal/replacement, particularly in areas with limited accessibility.

SUMMARY

Aspects of the present disclosure are generally directed to a tool for use with QR fasteners, and related methods and kits. The tool generally includes an elongate main body with a fastener-receiving area. The fastener-receiving area is configured to simultaneously support the head of the QR fastener and depress the button of the QR fastener. The fastener-receiving area includes a slot that is distally and downwardly open, two shoulders that bound the slot, and a ventral surface. The QR fastener is inserted into the slot so that the head of the QR fastener rests on the first and second shoulders, the collar portion of the QR fastener extends through the slot, and the ventral surface depresses the button of the QR fastener. With the button depressed in this fashion, the retention feature of the QR fastener is released, which allows the worker to manipulate the QR fastener by moving the tool. In some aspects, the tool has multiple fastener-receiving areas, that are advantageously differently sized from each other. Multiple such tools may be provided in a kit.

In one or more aspects, the present disclosure is directed to a tool for manipulating a Quick Release (QR) fastener. As mentioned above, the QR fastener has an unthreaded shank, an enlarged head, a collar portion between the shank and the enlarged head, a depressible button, and at least one moveable retention feature. The QR fastener is configured such that depressing the button releases the retention feature. The tool includes an elongate main body, with the main body including a distally disposed first fastener-receiving area. The first fastener-receiving area is configured to simultaneously support the head of the QR fastener and depress the button of the QR fastener. The first fastener-receiving area includes a first slot, first and second shoulders, and a first ventral surface. The first slot extends along a first slot longitudinal axis, and is distally and downwardly open. The first slot is configured to receive the collar portion of the QR fastener. The first and second shoulders laterally bound the first slot. The first and second shoulders are laterally spaced from one another and configured to support the enlarged head of the QR fastener. The first ventral surface is disposed above the first slot and has a first tapered section. In the first tapered section, a first vertical distance, between the first ventral surface and the first and second shoulders, decreases in a proximal direction. In some aspects, the main body further includes a proximally disposed second fastener-receiving area, with the second slot of the second fastener-receiving area being wider than the first slot.

In other aspects, the disclosure relates to a kit for manipulating a Quick Release (QR) fastener. The QR fastener is as described in the paragraph immediately above. The kit includes a plurality of tools, with each of the tools being as described in the paragraph immediately above. Each of the first slots are differently sized from the first slots of the other tools of the plurality of tools. In some aspects, the main body of each tool of the plurality of tools further includes a respective proximally disposed second fastener-receiving area, with the second fastener-receiving area including a respective second slot. In some aspects, the first slot of each tool of the plurality of tools is differently sized from the second slot of that tool.

In one or more other aspects, the present disclosure is directed to a method manipulating a Quick Release (QR) fastener. The QR fastener is as described two paragraphs above. The method includes optionally providing a tool, with the tool being as described two paragraphs above. The method includes inserting the head of the QR fastener into the first fastener-receiving area of the tool. The inserting includes 1) sliding the enlarged head of the QR fastener proximally into the first fastener-receiving area; and 2) supporting the enlarged head from underneath during the sliding while gradually depressing the button of the QR fastener with the tool such that at least one moveable retention feature of the QR fastener is released. The method further includes manipulating the QR fastener while the QR fastener remains inserted in the fastener-receiving area by manipulating the tool with the button depressed.

The features, functions, and advantages that have been discussed can be achieved independently in various aspects or may be combined in yet other aspects further details of which can be seen with reference to the following description and the drawings.

BRIEF DESCRIPTION OF THE DRAWINGS

Having thus described the disclosure in general terms, reference will now be made to the accompanying drawings, which are not necessarily drawn to scale.

FIG. 1 shows a perspective view of an exemplary QR fastener.

FIG. 2 shows a side view of the QR fastener of FIG. 1, with the lanyard omitted.

Figure 3:
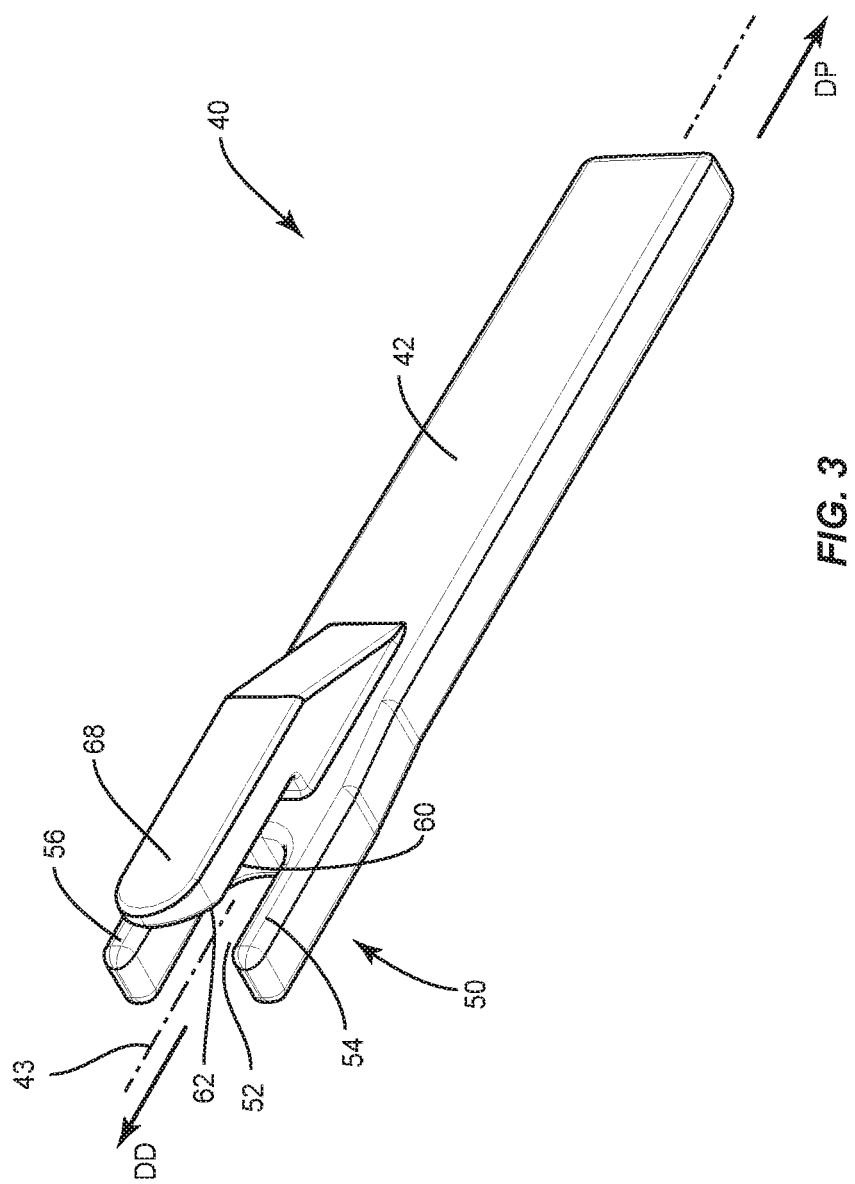

FIG. 3 shows perspective view of a tool according to aspects of the present disclosure.

FIG. 4 shows a side view of the tool of FIG. 3.

FIG. 5 shows a bottom view of the tool of FIG. 3.

Figure 6:
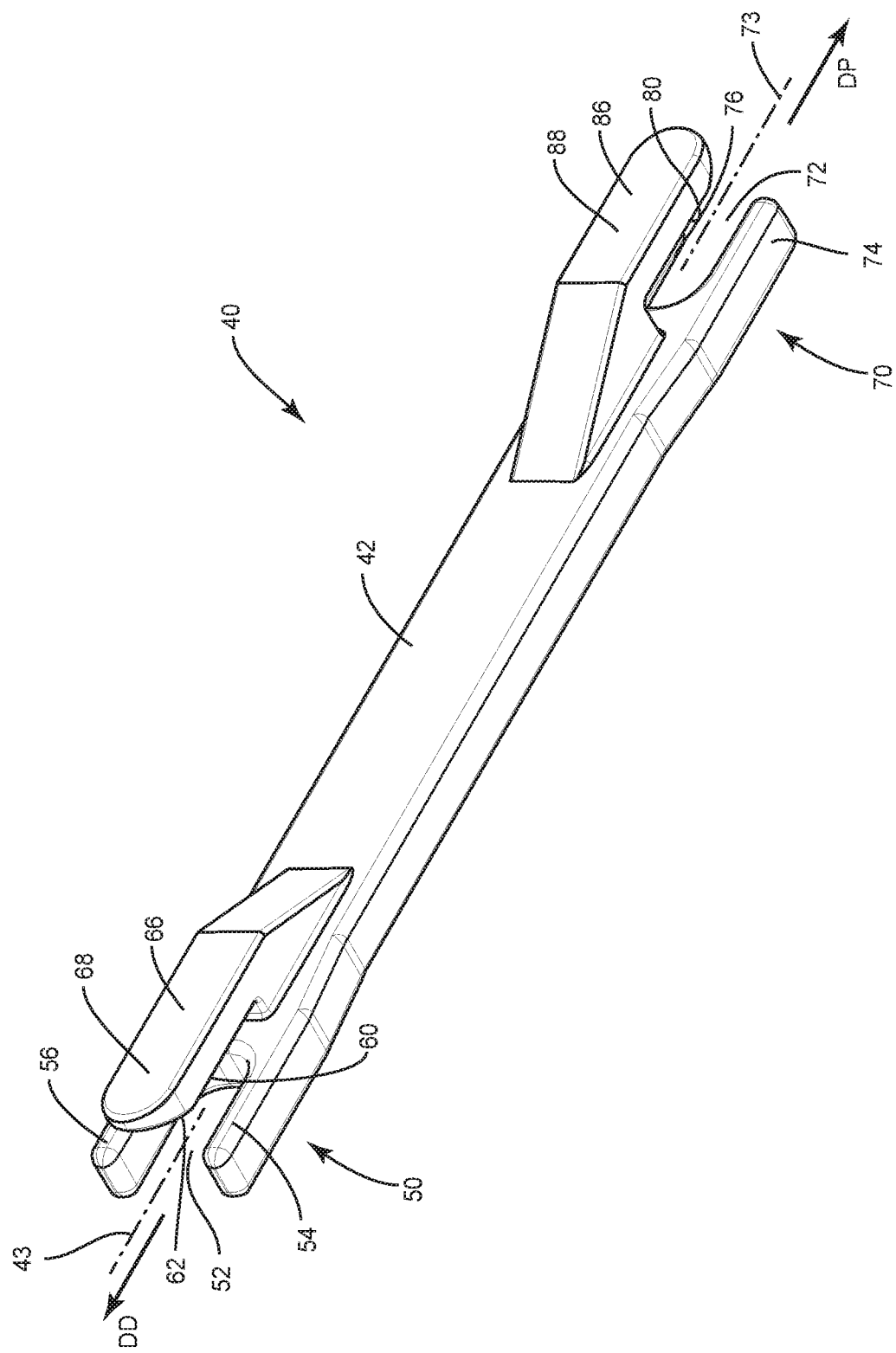

FIG. 6 shows perspective view of another tool according to aspects of the present disclosure.

Figure 7:
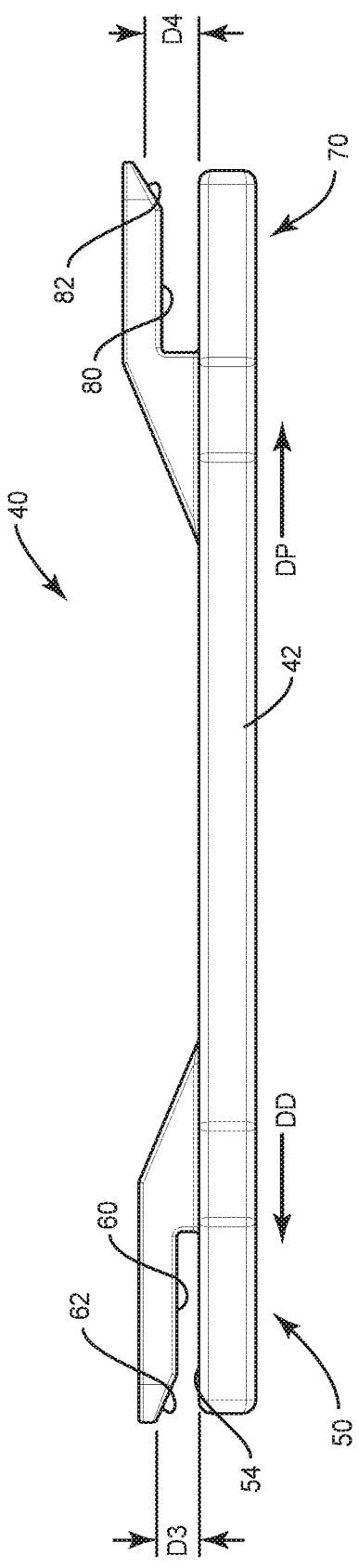

FIG. 7 shows a side view of the tool of FIG. 6.

Figure 8:
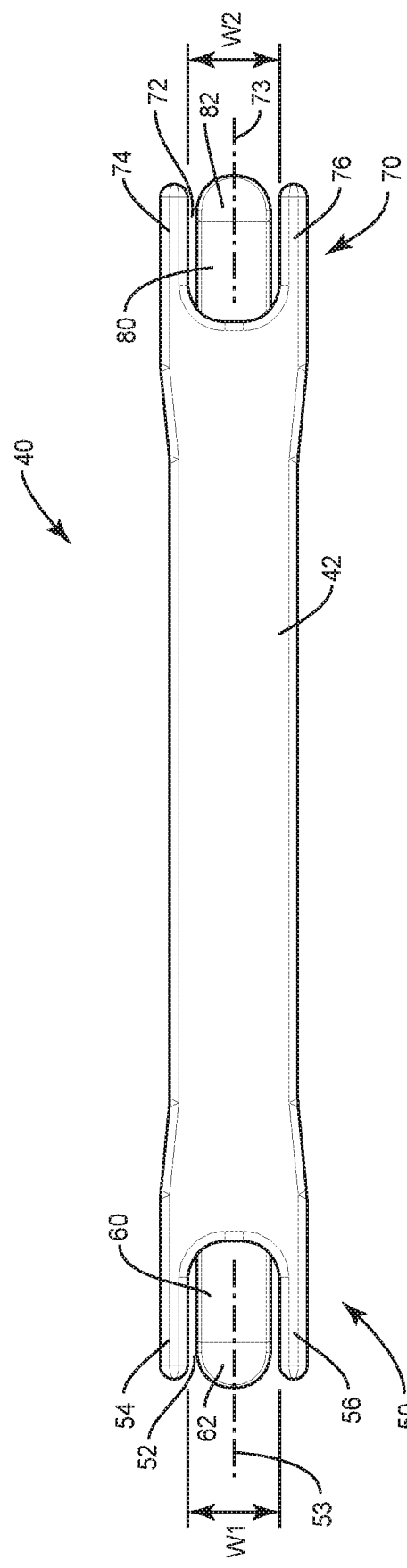

FIG. 8 shows a bottom view of the tool of FIG. 6.

Figure 9:
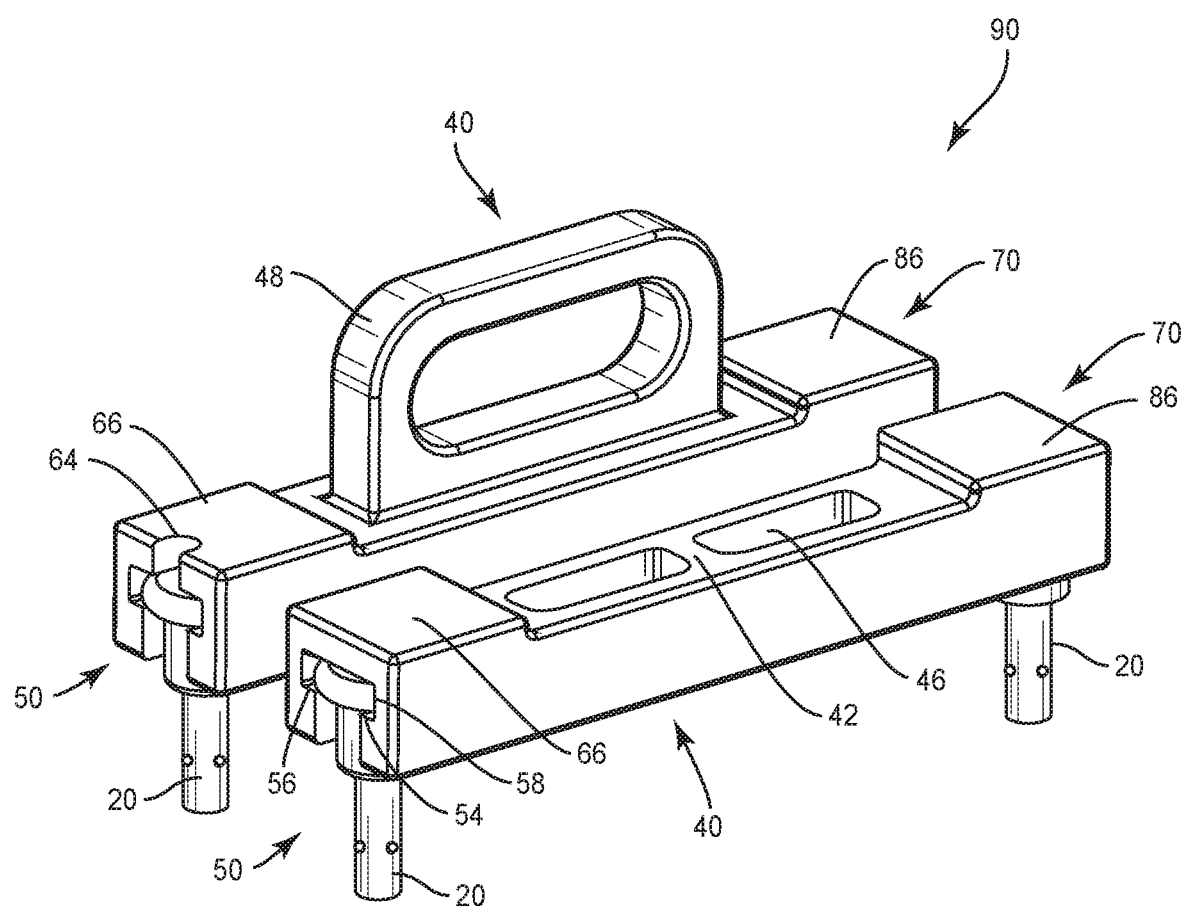

FIG. 9 shows perspective view of a further tool according to aspects of the present disclosure.

Figure 10:
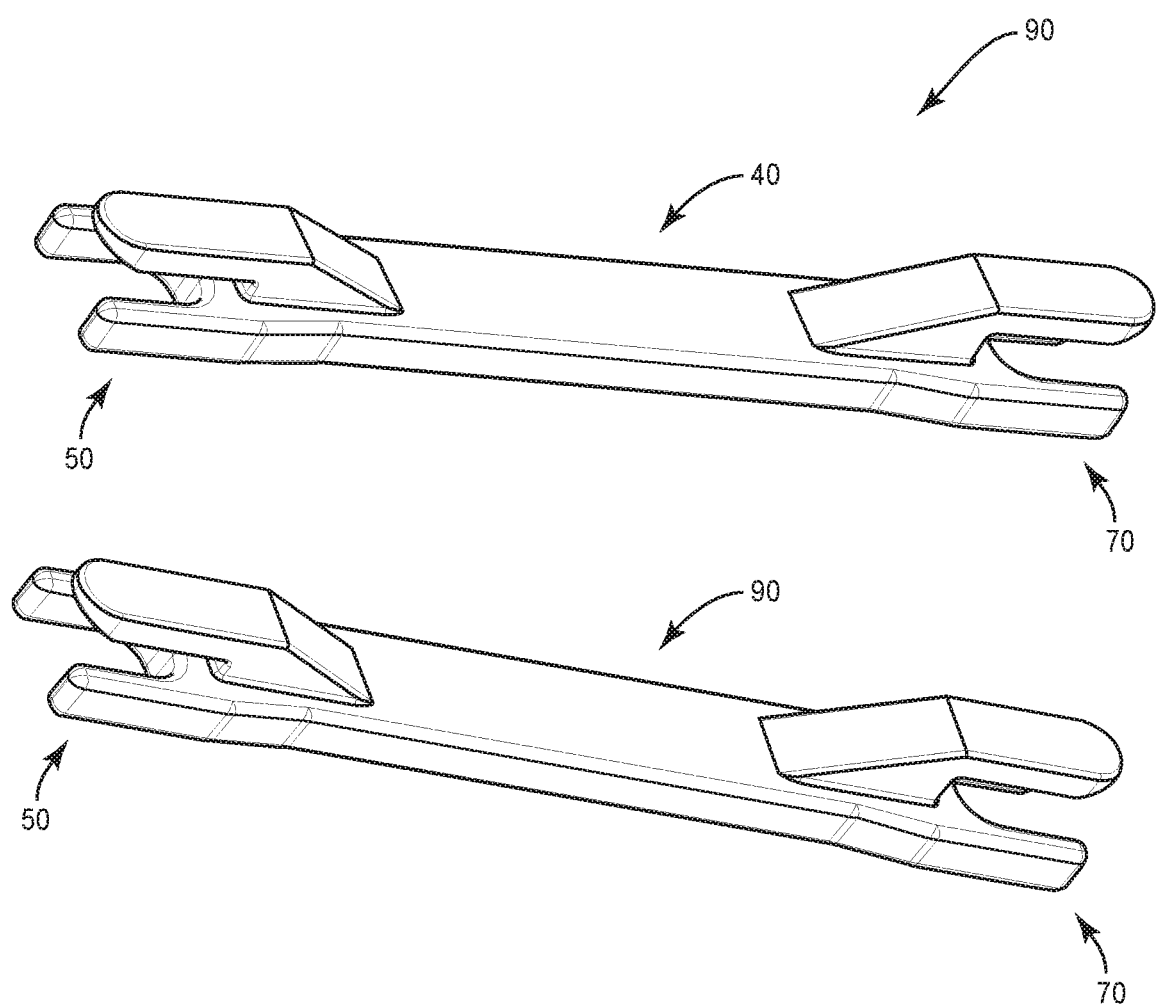

FIG. 10 shows a kit having two tools according to aspects of the present disclosure.

Figure 11:
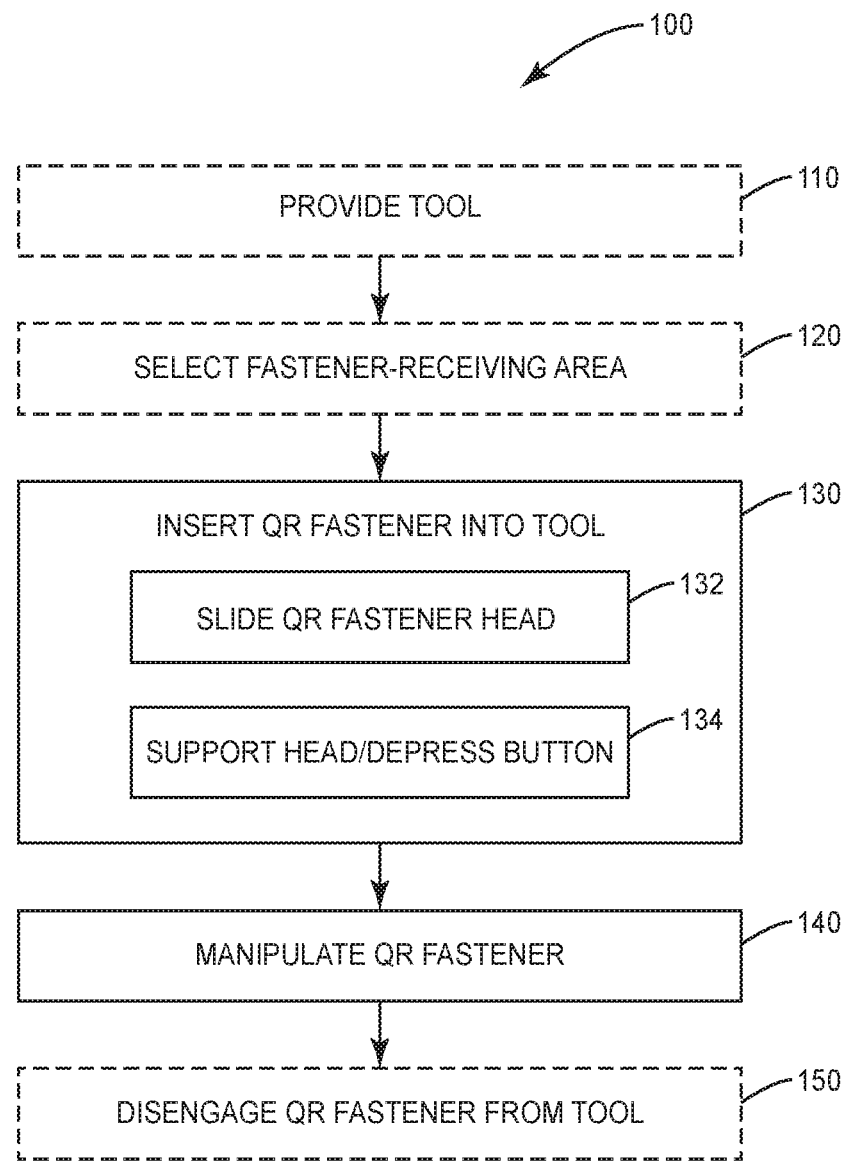

FIG. 11 shows a flowchart pertaining to aspects of the present disclosure.

DETAILED DESCRIPTION

Aspects of the present disclosure are generally directed to a tool for use with QR fasteners, and related methods and kits. The tool generally includes an elongate main body with a fastener-receiving area. The fastener-receiving area is configured to simultaneously support the head of the QR fastener and depress the button of the QR fastener. The fastener-receiving area includes a slot that is distally and downwardly open, two shoulders that bound the slot, and a ventral surface. The QR fastener is inserted into the slot so that the head of the QR fastener rests on the first and second shoulders, the collar portion of the QR fastener extends through the slot, and the ventral surface depresses the button of the QR fastener. With the button depressed in this fashion, the retention feature of the QR fastener is released, which allows the worker to manipulate the QR fastener by moving the tool.

An exemplary QR fastener 20 is shown in FIGS. 1-2. In general, the QR fastener 20 includes an unthreaded shank 22 that extends along a shank axis 26. The shank 22 is typically cylindrical. The tip end 23 of the shank 22 is typically slightly tapered to facilitate insertion of the shank 22 into a corresponding hole. A head 30 and a collar portion 36 are attached to the shank 22, generally opposite the tip end 23. The head 30 is enlarged relative to the shank 22 and is generally shaped like a disk, with a diameter D1. The head 30 is disposed perpendicular to the shank axis 26. In some versions of a QR fastener 20, a lanyard 32 may be attached to the head 30, typically at a radially outward position. The head 30 movably supports the button 38, discussed further below. The collar portion 36 is disposed between the head 30 and the shank 22, and has a collar portion diameter D2 larger than the shank, but substantially less than D1. As measured along the shank axis 26, the collar portion 36 is significantly "longer" than the head 30, and typically has a tapered portion toward the shank 22. At least one retention feature 24, typically taking the form of spring biased balls, are movably mounted to the shank 22 in spaced relation to head 30. The head 30 and shank 22 include a mechanism for controlling the state (e.g., locked or unlocked) of the retention feature. The button 38 is part of this mechanism. When the button 38 is not depressed, the retention feature 24 is locked. The button 38 may be depressed (moved toward the tip end 23) to release the retention feature 24. Note that the button 38 is spring loaded to an extended position corresponding to a locked condition for the retention feature 24. Operation of QR fasteners 20 is generally understood by those of skill in the art, so further details of the QR fastener 20 is omitted for brevity. However, it should be noted that QR fasteners 20 come in a variety of shank diameters, head diameters, shank lengths, and distances (along the shank axis 26) between the underside of the head 30 and the retention features 24.

A tool according to one or more aspects is shown in FIGS. 3-5, generally indicated at 40. The tool 40 includes an elongate main body 42, which in FIGS. 3-5 is shown as being elongate along a main longitudinal axis 43. For ease of reference, the direction towards the left in FIGS. 3-5 will be called the distal direction (DD), and the direction towards the right in FIGS. 3-5 will be called the proximal direction (DP). In some aspects, the main body 42 may include one or more through passages 46 (see FIG. 9) or other material-reducing features known in the art.

The main body 42 includes one or more fastener-receiving areas 50, such as distally disposed first fastener-receiving area 50. The first fastener-receiving area 50 is configured to simultaneously support the head 30 of the QR fastener 20 and depress the button 38 of the QR fastener 20. The first fastener-receiving area 50 includes a first slot 52, first and second shoulders 54,56, and a surface 60, referred to as a first ventral surface 60 because it faces downward in FIG. 4. The first slot 52 extends along a first slot longitudinal axis 53, which is advantageously disposed parallel to the main longitudinal axis 43. The first slot 52 is laterally bounded by the first and second shoulders 54,56, and has a lateral width of W1. The first slot 52 is closed at one end, but is distally and downwardly open. The first slot 52 is configured to receive the collar portion 36 of the QR fastener 20. Thus, the first slot 52 is appropriately sized to receive the QR fasteners 20 having a corresponding size of collar portions 36 (or optionally a small range of sizes). The first and second shoulders 54,56 laterally bound the first slot 52. The first and second shoulders 54,56 are laterally spaced from one another and configured to support the enlarged head 30 of the QR fastener 20. The first ventral surface 60 is disposed above the first slot 52 and has a first tapered section 62. In the first tapered section 62, a first vertical distance D3 between the first ventral surface 60 and the first and second shoulders 54, 56 decreases in the proximal direction DP. Thus, the first tapered section 62 is configured to function as a cam surface, as discussed further below. The first tapered section 62 is optionally flat or curved. The first tapered section 62 may form the most proximal portion of the first ventral surface 60, or may be located at an intermediate location along the first ventral surface 60. The first tapered section 62 longitudinally and laterally overlies the first slot 52 when viewed in plan view, so that when the QR fastener 20 is inserted in the first fastener-receiving area 50, the button 38 is depressed as it traverses the first tapered section 62. In some aspects, the structure forming the first ventral surface 60 includes a distal recess 64 configured to receive the optional lanyard 32 present on some QR fasteners 20. In some aspects, a first flange 68 extends from the main body 42 distally above the first slot 52 in cantilever fashion and provides the structure forming the first ventral surface 60. The upper surface of the flange 68, or other structure forming the first ventral surface 60, advantageously forms a first tapping pad 66 disposed above the first ventral surface 60 for tapping the QR fastener 20 into place, as discussed further below.

In some aspects, the tool 40 is straight, such that first slot longitudinal axis 53 is parallel to main longitudinal axis 43 (optionally coincident therewith). In some aspects, the tool 40 is not generally straight. For example, in some aspects, the tool 40 is generally angled, so that first slot longitudinal axis 53 is not parallel to main longitudinal axis 43.

In some aspects, the tool 40 is single-ended, so that the tool 40 includes only one fastener-receiving area. In other aspects, the tool 40 includes two or more fastener-receiving areas. For example, the tool 40 of FIGS. 6-8 is double ended. The tool 40 of FIGS. 6-8 includes a main body 42 having a distally disposed first fastener-receiving area 50 as described above. In addition, the main body 42 further includes a proximally disposed second fastener-receiving area 70. The second fastener-receiving area 70 is configured to simultaneously support the head 30 of the QR fastener 20 and depress the button 38 of the QR fastener 20. The second fastener-receiving area 70 includes a second slot 72, third and fourth shoulders 74,76, and a second ventral surface 80. The second slot 72 extends along a second slot longitudinal axis 73, which is advantageously disposed parallel to the main longitudinal axis 43. The second slot 72 is laterally bounded by the third and fourth shoulders 74,76, and has a lateral width of W2. In some aspects, the first slot 52 and second slot 72 are of the same width. In some aspects, the second slot 72 is wider than the first slot 52, so that W1 and W2 are different. The second slot 72 is closed at one end, but is distally and downwardly open. The second slot 72 is configured to receive the collar portion 36 of the QR fastener 20. Thus, the second slot 72 is appropriately sized to receive the QR fasteners 20 having a corresponding size of collar portions 36 (or a small range of sizes). The third and fourth shoulders 74,76 laterally bound the second slot 72. The third and fourth shoulders 74,76 are laterally spaced from one another and configured to support the enlarged head 30 of the QR fastener 20. The second ventral surface 80 is disposed above the second slot 72 and has a second tapered section 82. In the second tapered section 82, a second vertical distance D4 between the second ventral surface 80 and the third and fourth shoulders 74,76 decreases in a distal direction DD. Thus, the second tapered section 82 is configured to function as a cam surface, similar to first tapered section 62 of the first ventral surface 60. And, similar to first tapered section 62, second tapered section 82 is optionally flat or curved. The second tapered section 82 may form the most distal portion of the second ventral surface 80, or may be disposed at an intermediate location along the second ventral surface 80. The second tapered section 82 longitudinally and laterally overlies the second slot 72 when viewed in plan view, so that when the QR fastener 20 is inserted in the second fastener-receiving area 70, the button 38 is depressed as it traverses the second tapered section 82. In some aspects, the structure forming the second ventral surface 80 includes a distal recess (not shown) configured to receive the optional lanyard 32 present on some QR fasteners 20. In some aspects, a second flange 88 extends from the main body 42 distally above the second slot 72 in cantilever fashion and provides the structure forming the second ventral surface 80. The upper surface of the second flange 88, or other structure forming the second ventral surface 80, advantageously forms a second dorsal tapping pad 86 disposed above the second ventral surface 80 for tapping the QR fastener 20 into place, similar to the first tapping pad 66.

In some aspects, the tool 40 includes at least one vertical through passage 46 disposed between the first and second fastener-receiving areas 50,70. In other aspects, the main body 42 does not include vertical through passages 46.

In some aspects, there are more than two fastener-receiving areas, so that the tool 40 has three, four, five, etc. fastener-receiving areas, which are advantageously sized differently from each other. The various fastener-receiving areas may be symmetrically or asymmetrically disposed about the tool 40.

For some aspects, such as those shown in FIGS. 3-8, the first fastener-receiving area 50 and/or the second fastener-receiving area 70 include respective ventral surfaces 60,80 formed by respective first and second flanges 68,88 that cantilever from the main body 42 so that there is lateral gap on both sides of the corresponding fastener-receiving area. In other aspects, one or more of the fastener-receiving areas are laterally enclosed. For example, the first fastener-receiving area 50 of the tool 40 of FIG. 9 has lateral sidewalls 58 that connect the first and second shoulders 54,56 to the first ventral surface 60. Such a construction may be advantageous if the tool 40 is formed by a 3D printing process. In some aspects, the tool 40 includes a mix of laterally open and laterally closed fastener-receiving areas.

In some aspects, the tool 40 optionally includes a handle 48 affixed to an upper portion of the main body 42, in longitudinally spaced relation to the first slot 52. The handle 48 facilitates manipulation of the tool 40 in some situations. The handle 48 may optionally take a variety of forms, with a form that extends vertically up from an upper portion of the main body 42, midway between the distal and proximal ends of the main body 42, believed to be advantageous.

The various portions of the tool 40 are made from any suitable materials, such as aluminum, steel, plastic (with or without reinforcement), etc. Advantageously, the tool 40 is unitarily formed, although this is not required.

In some aspects, a plurality of the tool(s) 40 described herein may be provided as all or part of a kit 90 for manipulating a QR fastener 20. See FIG. 10. The kit 90 includes a plurality of tools 40, with each of the tools 40 being as described herein. The tools 40 are optionally generally similarly configured, except for sizes of their respective first fastener-receiving areas 50 (optionally also second fastener-receiving areas 70, etc.), but dissimilar configurations are also/alternatively contemplated. Thus, each of the tools 40 include an elongate main body 42 that includes at least a distally disposed first fastener-receiving area 50. The first fastener-receiving area 50 is configured to simultaneously support the head 30 of the QR fastener 20 and depress the button 38 of the QR fastener 20. The first fastener-receiving area 50 includes a first slot 52, first and second shoulders 54,56, and a first ventral surface 60. The first slot 52 extends along a first slot longitudinal axis 53, with the first slot 52 being closed at one end, but distally and downwardly open. The first slot 52 is configured to receive the collar portion 36 of the QR fastener 20. The first and second shoulders 54,56 laterally bound the first slot 52. The first and second shoulders 54,56 are laterally spaced from one another and configured to support the enlarged head 30 of the QR fastener 20. The first ventral surface 60 is disposed above the first slot 52 and has a first tapered section 62. In the first tapered section 62, the first vertical distance D3 between the first ventral surface 60 and the first and second shoulders 54,56 decreases in a proximal direction DP. Each of the first slots 52 of the respective tools 40 are advantageously differently sized from the first slots 52 of the other tools 40 of the plurality of tools 40 of the kit 90. Some or all of the tools 40 are optionally single-ended (e.g., as shown in FIGS. 3-5), and/or optionally double-ended (e.g., as shown in FIGS. 3-8), and/or otherwise have two or more fastener-receiving areas. Thus, some or all of the tools 40 of the kit 90 optionally include the second fastener-receiving area 70 described above. For kits 90 having tools 40 with multiple fastener-receiving areas 50,70, the first slot 52 of each tool 40 of the plurality of tools 40 is advantageously differently sized from the second slot 72 of that tool 40.

In some aspects, the tool(s) 40 described herein may be used in a method (100) of manufacturing or servicing. For example, the tool(s) 40 described herein are advantageously used for manipulating a QR fastener 20 during manufacturing or servicing an aircraft. Referring to FIG. 11, the method (100) includes optionally providing (110) a tool 40 for QR manipulation as described herein. Thus, the tool 40 advantageously includes an elongate main body 42 that includes the distally disposed first fastener-receiving area 50. The first fastener-receiving area 50 is configured to simultaneously support the head 30 of the QR fastener 20 and depress the button 38 of the QR fastener 20. The first fastener-receiving area 50 includes a first slot 52, first and second shoulders 54,56, and a first ventral surface 60. The first slot 52 extends along a first slot longitudinal axis 53, with the first slot 52 being distally and downwardly open. The first slot 52 is configured to receive the collar portion 36 of the QR fastener 20. The first and second shoulders 54,56 laterally bound the first slot 52. The first and second shoulders 54,56 are laterally spaced from one another and configured to support the enlarged head 30 of the QR fastener 20. The first ventral surface 60 is disposed above the first slot 52 and has the first tapered section 62. In the first tapered section 62, the first vertical distance D3 between the first ventral surface 60 and the first and second shoulders 54,56 decreases in a proximal direction DP.

The method (100) includes inserting (130) the enlarged head of the QR fastener 20 into the first fastener-receiving area 50 of the tool 40. The inserting comprises: 1) sliding (132) the enlarged head 30 of the QR fastener 20 proximally into the first fastener-receiving area 50; and 2) supporting (134) the enlarged head 30 from underneath during the sliding while gradually depressing the button 38 of the QR fastener 20 with the tool 40 such that at least one moveable retention feature 24 of the QR fastener 20 is released. In some aspects, the inserting (130) comprises inserting the enlarged head 30 of the QR fastener 20 into the first fastener-receiving area 50 such that the collar portion 36 of the QR fastener 20 extends outward from the first slot 52. In some aspects, the inserting (130) includes 1) sliding (132) the enlarged head 30 of the QR fastener 20 proximally along the first slot longitudinal axis 53, between the first and second shoulders 54,56 and the first ventral surface 60; and 2) supporting (134) the enlarged head 30 from underneath with the first and second shoulders 54,56 while gradually pressing downward on the button 38 with the first ventral surface 60.

The method (100) further includes manipulating (140) the QR fastener 20, such as by inserting the QR fastener 20 into the desired hole in components to be joined, while the QR fastener 20 remains inserted in the fastener-receiving area 50 by manipulating the tool 40 with the button 38 depressed. In some aspects, the manipulating (140) includes installing and/or de-installing the QR fastener 20. In some aspects, the manipulating (140) includes urging the QR fastener 20 downward (or upward) by applying a downward (or upward) force to the tool 40. One approach to applying a downward force to the tool 40 is by hitting (tapping) the first tapping pad 66 with another tool. In some aspects, the manipulating (140) includes manipulating the QR fastener 20 while holding the tool 40 by only one hand during the manipulating. It should be understood that the method (100) may also be carried out in the same fashion by using the second fastener-receiving area 70 rather than the first fastener-receiving area 50, if the tool 40 is so equipped.

The method (100) optionally further includes subsequently dis-engaging (150) the QR fastener 20 from the tool 40 by sliding the QR fastener 20 distally relative to the first fastener-receiving area 50, so that the button 38 becomes unpressed.

In some aspects, the tool 40 also has a proximally disposed second fastener-receiving area 70, with the second fastener-receiving area 70 having a second slot 72 that is wider than the first slot 52. The method (100) then optionally includes, prior the inserting (130), selecting (120) between the first and second fastener-receiving areas 50,70.

In some aspects, the QR fastener 20 includes a lanyard 32 secured to the head 30, and the structure forming the first ventral surface 60 includes a distal recess 64 configured to receive the lanyard 32. The method (100) then optionally is such that the inserting (130) includes orienting the QR fastener 20 relative to the tool 40 such that the lanyard 32 is aligned with the recess 64 of the first ventral surface 60.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A tool for manipulating a Quick Release (QR) fastener, the QR fastener having an unthreaded shank, an enlarged head, a collar portion between the shank and the enlarged head, a depressible button, and at least one moveable retention feature, wherein the QR fastener is configured such that depressing the button releases the retention feature, the tool comprising:
    an elongate main body, the main body including a distally disposed first fastener-receiving area;
    wherein the first fastener-receiving area is configured to simultaneously support the head of the QR fastener and depress the button of the QR fastener, wherein the first fastener-receiving area comprises:
        a first slot that extends along a first slot longitudinal axis, the first slot being distally and downwardly open; the first slot configured to receive the collar portion of the QR fastener;
        first and second shoulders that laterally bound the first slot; the first and second shoulders laterally spaced from one another and configured to support the enlarged head of the QR fastener; and
        a first ventral surface disposed above the first slot and having a first tapered section; wherein, in the first tapered section, a first vertical distance between the first ventral surface and the first and second shoulders decreases in a proximal direction;
    wherein the first ventral surface is fixed relative to the first and second shoulders; and wherein the first slot is a through slot that is downwardly open such that the first ventral surface is visible between the first and second shoulders in direct bottom view.

2. The tool of claim 1, wherein the main body further comprises a proximally disposed second fastener-receiving area, wherein the second fastener-receiving area comprises:
    a second slot that extends along a second slot longitudinal axis, the second slot being proximally and downwardly open;
    third and fourth shoulders that laterally bound the second slot; and
    a second ventral surface disposed above the second slot and having a second tapered section; wherein, in the second tapered section, a second vertical distance between the second ventral surface and the third and fourth shoulders decreases in a proximal direction.

3. The tool of claim 2, wherein the second slot is wider than the first slot.

4. The tool of claim 1, wherein the first tapered section is flat.

5. The tool of claim 1, wherein the first fastener-receiving area further comprises a first dorsal tapping pad disposed above the first ventral surface.

6. The tool of claim 1, further comprising a handle affixed to an upper portion of the main body, in longitudinally spaced relation to the first slot.

7. The tool of claim 1, wherein the first fastener-receiving area further comprises lateral sidewalls that connect the first and second shoulders to the first ventral surface.

8. The tool of claim 1, wherein a first flange extends distally above the slot in cantilever fashion, wherein the first flange defines the first ventral surface.

9. The tool of claim 1, wherein the first ventral surface includes a distal recess configured to receive a lanyard.

10. The tool of claim 1:
wherein the main body extends along a main longitudinal axis; and
wherein the main longitudinal axis and the first slot longitudinal axis are parallel.

11. A method of manipulating a Quick Release (QR) fastener; the method comprising:
inserting an enlarged head of the QR fastener into a first fastener-receiving area of a tool for QR manipulation, wherein the inserting comprises:
sliding the enlarged head of the QR fastener proximally into the first fastener-receiving area;
supporting the enlarged head from underneath during the sliding while gradually depressing a button of the QR fastener with the tool such that at least one moveable retention feature of the QR fastener is released;
manipulating the QR fastener while the QR fastener remains inserted in the fastener-receiving area by manipulating the tool with the button depressed.

12. The method of claim 11, wherein the manipulating comprises installing and/or de-installing the QR fastener.

13. The method of claim 11, further comprising subsequently dis-engaging the QR fastener from the tool by sliding the QR fastener distally relative to the first fastener-receiving area, so that the button becomes unpressed.

14. The method of claim 11:
wherein the QR fastener has an unthreaded shank, and a collar portion between the shank and the enlarged head;
wherein the QR fastener is configured such that depressing the button releases the retention feature;
wherein the first fastener-receiving area is configured to simultaneously support the head of the QR fastener and depress the button of the QR fastener, wherein the first fastener-receiving area comprises:
a first slot that extends along a first slot longitudinal axis, the first slot being distally and downwardly open; the first slot configured to receive a collar portion of the QR fastener;
first and second shoulders that laterally bound the first slot; the first and second shoulders laterally spaced from one another and configured to support the enlarged head of the QR fastener; and
a first ventral surface disposed above the first slot and having a first tapered section; wherein, in the first tapered section, a first vertical distance between the first ventral surface and the first and second shoulders decreases in a proximal direction;
wherein the inserting comprises inserting the head of the QR fastener into the first fastener-receiving area such that the collar portion of the QR fastener extends outward from the slot;
wherein the sliding comprises sliding the enlarged head of the QR fastener proximally along the first slot longitudinal axis, between the first and second shoulders and the first ventral surface;
wherein the supporting comprises supporting the enlarged head from underneath with the first and second shoulders while gradually pressing downward on the button with the first ventral surface.

15. The method of claim 11:
wherein the tool further comprises a second fastener-receiving area that is proximally disposed; wherein the second fastener-receiving area comprises a second slot that is wider than the first slot; and
wherein the method further comprises, prior the inserting, selecting between the first and second fastener-receiving areas.

16. The method of claim 11, wherein the manipulating comprises manipulating the QR fastener while holding the tool by only one hand during the manipulating.

17. The method of claim 11:
wherein the first ventral surface includes a distal recess;
wherein the QR fastener further comprises a lanyard secured to the head; and
wherein the inserting comprises orienting the QR fastener relative to the tool such that the lanyard is aligned with the recess of the ventral surface.

18. A kit for manipulating a Quick Release (QR) fastener, the QR fastener having an unthreaded shank, an enlarged head, a collar portion between the shank and the enlarged head, a depressible button, and at least one moveable retention feature, wherein the QR fastener is configured such that depressing the button releases the retention feature, the kit comprising:
plurality of tools, each tool of the plurality of tools comprising:
an elongate main body, the main body including a distally disposed first fastener-receiving area;
wherein the first fastener-receiving area is configured to simultaneously support the head of the QR fastener and depress the button of the QR fastener, wherein the first fastener-receiving area comprises:
a first slot that extends along a first slot longitudinal axis, the first slot being distally and downwardly open; the first slot configured to receive the collar portion of the QR fastener;
first and second shoulders that laterally bound the first slot; the first and second shoulders laterally spaced from one another and configured to support the enlarged head of the QR fastener; and
a first ventral surface disposed above the first slot and having a first tapered section; wherein, in the first tapered section, a first vertical distance between the first ventral surface and the first and second shoulders decreases in a proximal direction; and
wherein each of the first slots are differently sized from the first slots of the other tools of the plurality of tools.

19. The kit of claim 18, wherein the main body of each tool of the plurality of tools further comprises a respective proximally disposed second fastener-receiving area, wherein the second fastener-receiving area comprises:

a second slot that extends along a second slot longitudinal axis, the slot being proximally and downwardly open;

third and fourth shoulders that laterally bound the second slot; and a second ventral surface disposed above the second slot and having a second tapered section; wherein, in the second tapered section, a second vertical distance between the second ventral surface and the third and fourth shoulders decreases in a proximal direction.

20. The kit of claim 19, wherein the first slot of each tool of the plurality of tools is differently sized from the second slot of that tool.

\* \* \* \* \*